(No Model.) 2 Sheets—Sheet 1.

H. C. MOORE.
PLOW AND GRUBBER.

No. 366,597. Patented July 12, 1887.

WITNESSES:
Fred G. Dieterich
P. B. Turpin.

INVENTOR:
Henry C. Moore
BY Munn & Co
ATTORNEYS.

(No Model.) 2 Sheets—Sheet 2.
H. C. MOORE.
PLOW AND GRUBBER.
No. 366,597. Patented July 12, 1887.
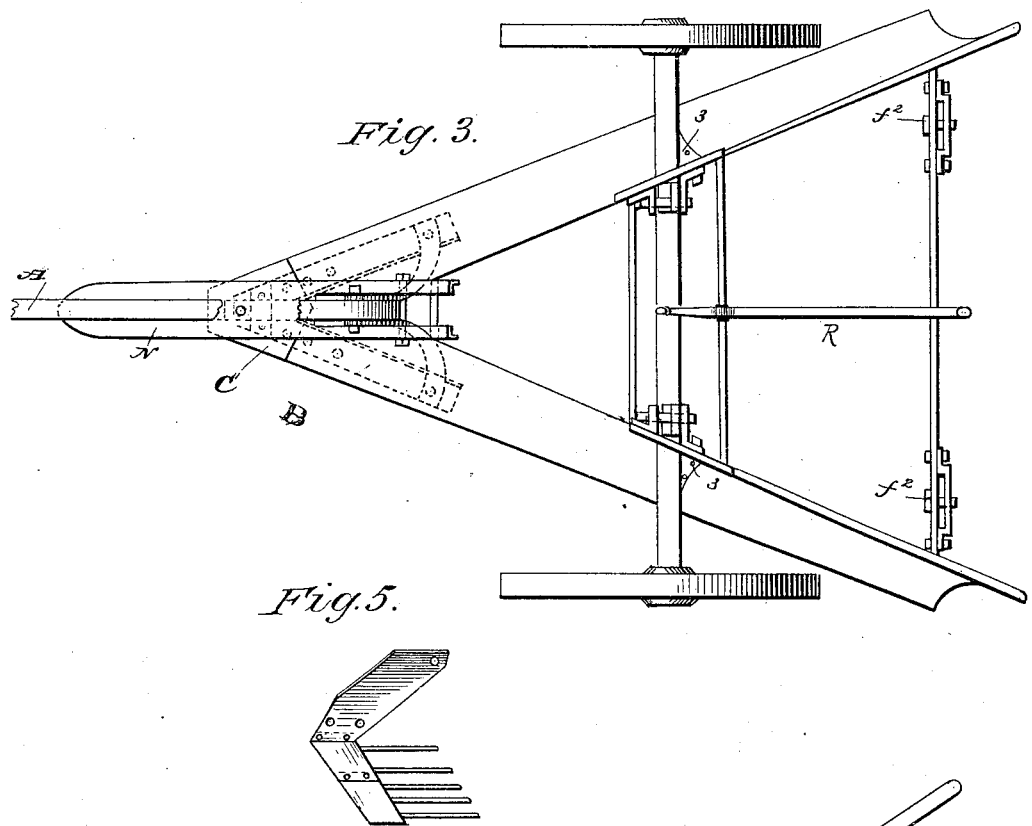
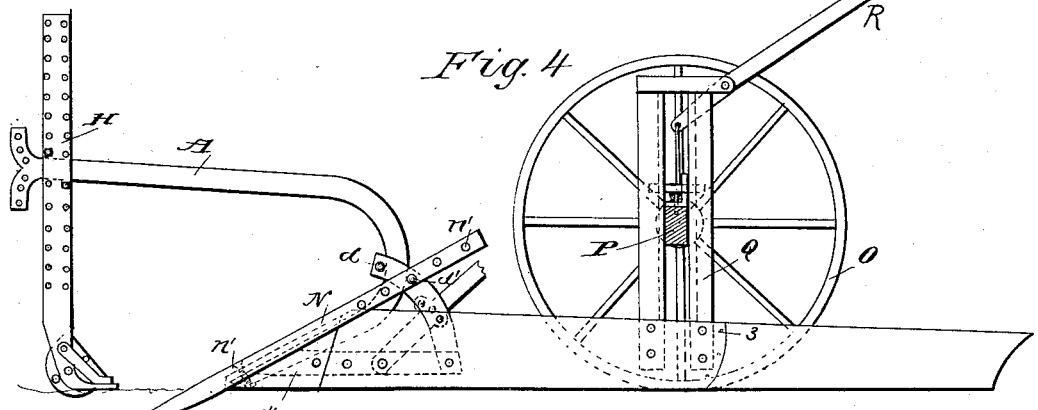

UNITED STATES PATENT OFFICE.

HENRY C. MOORE, OF TAMA CITY, IOWA.

PLOW AND GRUBBER.

SPECIFICATION forming part of Letters Patent No. 366,597, dated July 12, 1887.

Application filed February 28, 1887. Serial No. 229,116. (No model.)

*To all whom it may concern:*

Be it known that I, HENRY C. MOORE, of Tama City, in the county of Tama and State of Iowa, have invented a new and useful Improvement in Plows and Grubbers, of which the following is a specification.

My invention is an improved machine or implement seeking to provide constructions combining capacity for a variety of work in the cultivation and reclamation of desert sagebrush lands, making irrigating-ditches, grubbing sage, and leveling land; also for the construction of drainage, tile, gas, and water pipe ditches. These objects I attain by an adjustable plow with interchangeable parts, as fully set forth in the accompanying specification and drawings, in which latter—

Figure 1:
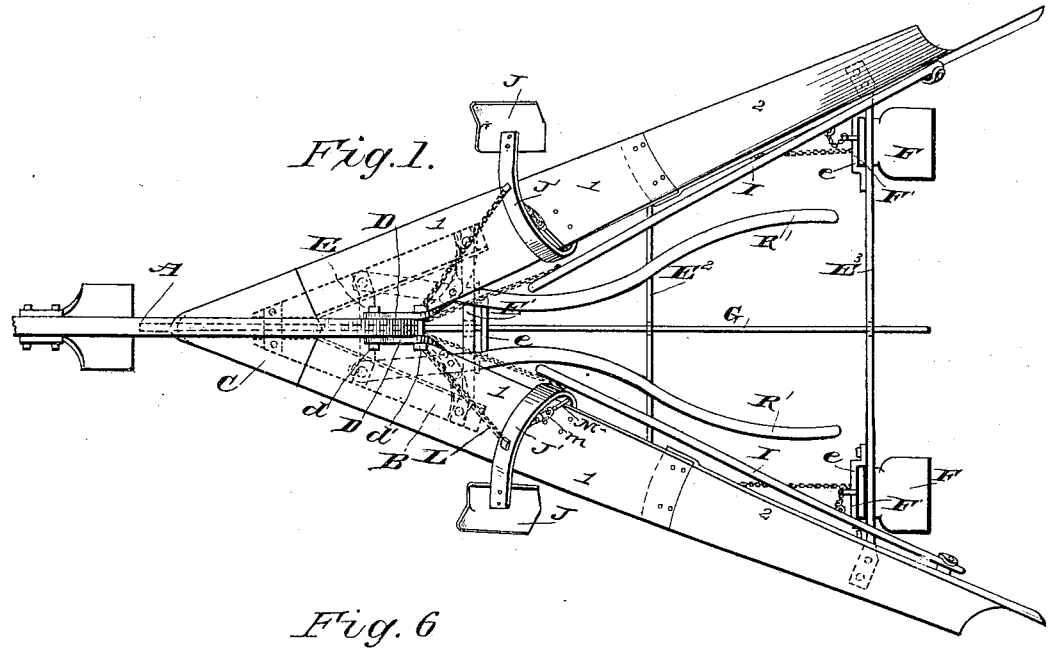
Figure 6:
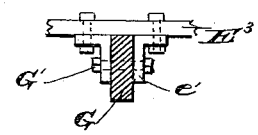
Figure 2:
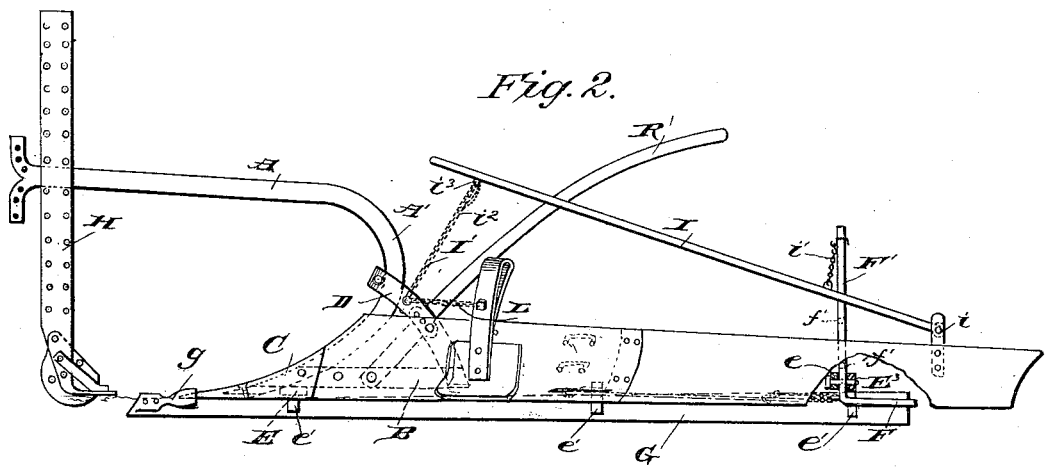

Figure 1 is a plan view. Fig. 2 is a side elevation. Fig. 3 is a plan view. Fig. 4 is a side elevation, and Figs. 5 and 6 are detail views.

The invention consists in certain features of construction and novel combinations of parts, as will be described and claimed.

The beam A is provided at its forward end with means for connecting the draft, and at its rear end curves downward and forward, forming a standard, A'. To this standard, at its lower end, is secured a plate, B, as shown in dotted lines, which extends back sufficiently far to serve as a support for the forward sections, 1, of the mold-board, the rear sections, 2, being connected with such forward sections, and being braced in the manner presently described.

The point C is secured on the forward portion of the skeleton B, and may be removed and replaced by a plate, C', as shown in Figs. 3 and 4, when the bull-tongue, as shown in said figures, is employed.

Brace arms D lap at their upper ends on opposite sides of the upper end of the standard and extend down behind the front mold-board sections, and are secured to the plate B. These braces are secured to the standard by bolts $d\ d'$ in front and rear of such standard, and which bolts, together with the arms D, form clips for uniting with the standard. It will be noticed that the arms D, together with the plate B, form the skeleton of the plow.

The mold-boards are braced by a plurality of cross-braces, E E' E² E³, the forward pair of which also extends between and braces the side sections of the skeleton frame B. The sections E' and E³ have guide-loops $e$ for the shanks F' of the rear gages, F. On the under side of the cross-braces I secure, usually by bolts, as shown in Fig. 6, depending lugs $e'$, forming sockets for the keel G, and between which said keel is secured by bolts G'.

At its forward end the keel G has a colter-like lip, $g$, forming a socket to receive the forward extremity of point C. This keel serves to hold the plow firmly in position when grubbing sage, and is to be removed when the point C is replaced by the plate C' and the bull-tongue is applied, as will be understood from Figs. 3 and 4.

The front gage, H, may be adjusted vertically and held at any suitable point by arranging the bolts which connect it with the beam in suitable holes.

The rear gages, F, may be depressed to any suitable extent by levers I, pivoted at $i$ to brackets on the mold-boards, near the rear ends of the latter, suitably connected at $i'$ (it may be by chains, as shown) with the gages, and having their forward ends held in the different adjustment by suitable retaining mechanism. That shown is preferred, and consists of a chain, I', connected at its lower end with the framing, and having its other end provided with a grab-hook, $i^2$, and passed through an eye, $i^3$, on the lever, and having such hook engaged with a suitable link of the chain.

Instead of employing the levers, the shanks F' may have a number of openings, $f'$, and the guides $e$ have similar openings, so that bolts $f^2$, as shown in Fig. 3, may be employed to secure such gages in any desired vertical adjustment.

It will be noticed that the gages at the front and rear, adjustable as described, compel conformity of movement with the surface of the ground and regulate and control the depth of cut desired, and by the adjustment of said gages up or down the implement may be set to run at various depths, and consequently be adapted to a greater variety of sizes of ditches, and may serve to regulate the slope of the banks of such ditches, as will be understood from the drawings.

The banking guards or fenders J are for the purpose of holding up and compressing the banks of small irrigating ditches in grain-fields or tillage crops. These fenders have spring-shanks J', which fit in one or the other of a plurality of sets of staples or keepers, J², secured on the inner sides of the mold-board sections. By means of a number of sets of keepers the fenders are applicable to two or more positions, as may be desired. I sustain these fenders in position by chains L, which lead forward to the framing of the plow and connect at their rear ends with the shanks J', and by means of brace-rods M, which connect with the shanks J' near the outer ends, and extend to that portion of the shanks near the mold-boards, having turn-buckles m, by which the fenders may be drawn inward or set farther outward, as desired, and be sustained in position to adapt it to ditches of different size. It will be understood that these banking-guards face inwardly toward the mold-board, and are not for the purpose of compressing the inner sides of the walls of ditches, but, rather, for pressing up the outer sides of the banks thrown up alongside the said ditches.

The bull-tongue N is channeled on its under side, as will be understood from Fig. 3, and has its lower forward end bent slightly forward, as shown in Fig. 4. At its upper end the bull-tongue is slotted to fit on opposite sides of the standard A', and its arms so formed are provided with a series of coincident holes, n, for the bolt d', so the bull-tongue may be adjusted to different depths, as will be understood from Figs. 3 and 4. The bolt n' also serves to secure the bull-tongue to the plate C', and a number of holes are formed through the tongue for such bolt, so the latter may be used in the different adjustments of the tongue. This bull-tongue is for the purpose of deepening ditches for laying pipe or tile.

It will be observed that in leveling land or grubbing sage-brush the plow lies in a flat position. To make a ditch, the front end is lowered and the rear end raised to suit the depth and width of the ditch and the slope of its banks desired. When the ditch is dug to the proper depth, the point C is removed and the bull-tongue applied, if in deepening a ditch with the bull-tongue one of the rear gages is applied to the center of cross-bar E', and the front and rear gages are lowered so the mold-boards of the plow will drag along the surface of the previous cut, moving the earth taken by the bull-tongue from the center to the outer side of the banks. In this use of the plow it will be understood that it may be held in place by the wheels O, supported on axle P, which is secured in guides Q, supported on the mold-board. The plow may be adjusted vertically by means of lever R. The forward end of beam may be supported in like manner by means of wheels similar to those shown in Figs. 3 and 4, or by means of a caster-wheel. The mold-board sections being bolted together at 3, it is manifest the rear sections may be removed when it is desired to narrow the plow.

In Fig. 5 the cultivator attachment is shown. When this construction is used, the mold-boards are removed and the construction shown in Fig. 5 is bolted or otherwise suitably secured in rear of the point C. When desired, handles R' may be employed.

I claim—

1. In combination with a double-mold-board plow provided with fixtures to receive it, a removable and longitudinally-extended keel arranged centrally between and extended below its mold-board, by the application of which a plow is converted into a brush-grubber, substantially as described.

2. In combination with a double-mold-board ditching-plow and cross-braces having depending lugs, the keel centrally located between lugs depending from the cross-braces extending below its mold-boards, and provided with a socket to receive the point of the plow, substantially as described.

3. The improvement in plows comprising the double mold-boards, the point, and the keel extended centrally between said mold-boards, and having a socketed point, g, fitted to receive the forward extremity of the plow-point, substantially as set forth.

4. A double-sided ditching-plow provided on the inner sides of its mold-boards with two or more sets of keepers to receive the shanks of the banking-guards, and the banking-guards for compressing the outer sides of the banks of small irrigating-ditches and to give those banks greater elevation, substantially as set forth.

5. A plow having a double mold-board and provided with a plurality of series of keepers arranged at different points along its length, combined with the banking-guards having shanks fitted to said keepers, substantially as set forth.

6. In a plow substantially as described, a banking-guard having a shank, combined with an adjusting-rod having a turn-buckle, whereby the position of said banking-guard may be varied, substantially as set forth.

7. The combination, with the plow and the banking-guard, of the adjusting-rod M, having turn-buckle m, and the chain L, substantially as set forth.

8. The combination of the mold-boards, the brace D, the cross-braces having depending lugs e', the keel fitted between said lugs, and having its forward end provided with a socket, g, fitted to receive the point of the plow, the banking-guards, and chains L, connecting the shanks of said guards with the brace D, substantially as set forth.

9. A ditching-plow provided with laterally-extended banking-guards which face inwardly toward the plow proper, substantially as set forth.

H. C. MOORE.

Witnesses:
P. B. TURPIN,
SOLON C. KEMON.